United States Patent [19]
Rhoades

[11] 3,752,126
[45] Aug. 14, 1973

[54] ANIMAL HANDLER
[76] Inventor: Henry W. Rhoades, 849 I St., Williams, Calif. 95987
[22] Filed: Jan. 26, 1972
[21] Appl. No.: 220,827

[52] U.S. Cl. .............................................. 119/103
[51] Int. Cl. ............................................. A61d 3/00
[58] Field of Search .................. 119/96, 98, 99, 103

[56] References Cited
FOREIGN PATENTS OR APPLICATIONS
220,868  4/1959  Australia.............................. 119/103

Primary Examiner—Louis G. Mancene
Assistant Examiner—J. A. Oliff
Attorney—Ernest L. Brown

[57] ABSTRACT

An apparatus for upending animals such as sheep, having a chute adapted to entice entry of such animals, a cradle adapted to be forced into contact with the animal, and means for rotating the cage formed between the chute and cradle.

28 Claims, 11 Drawing Figures

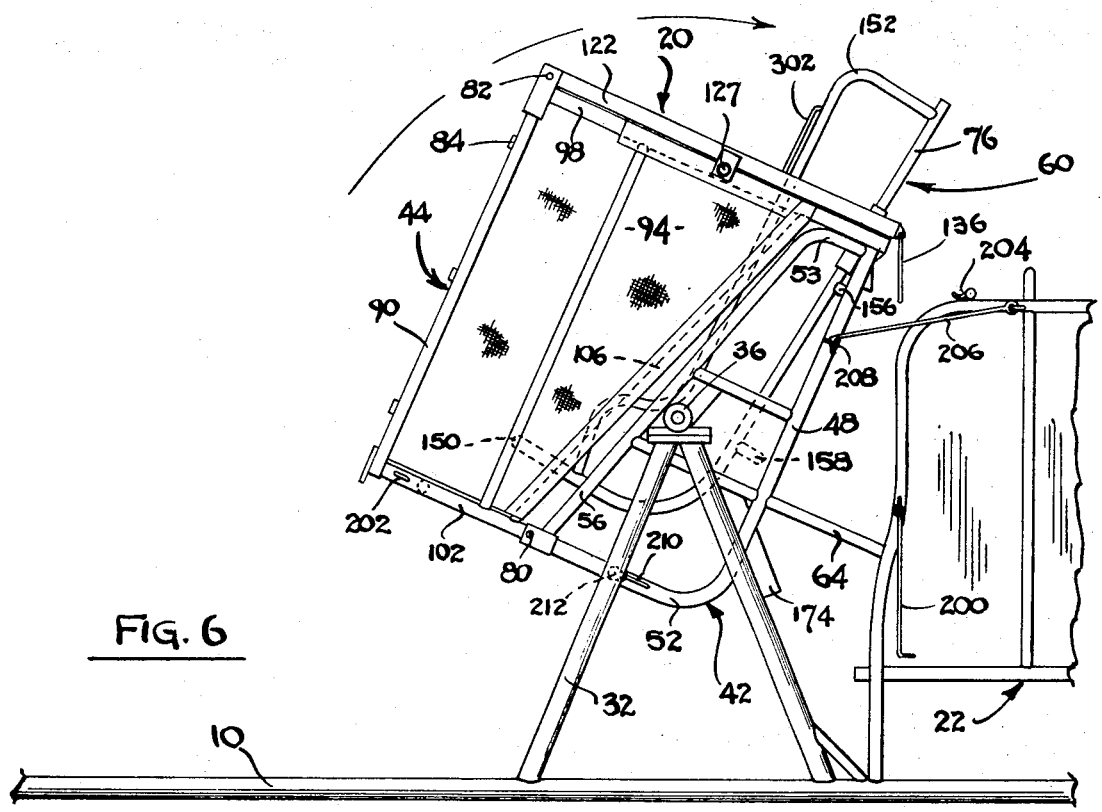
FIG. 6
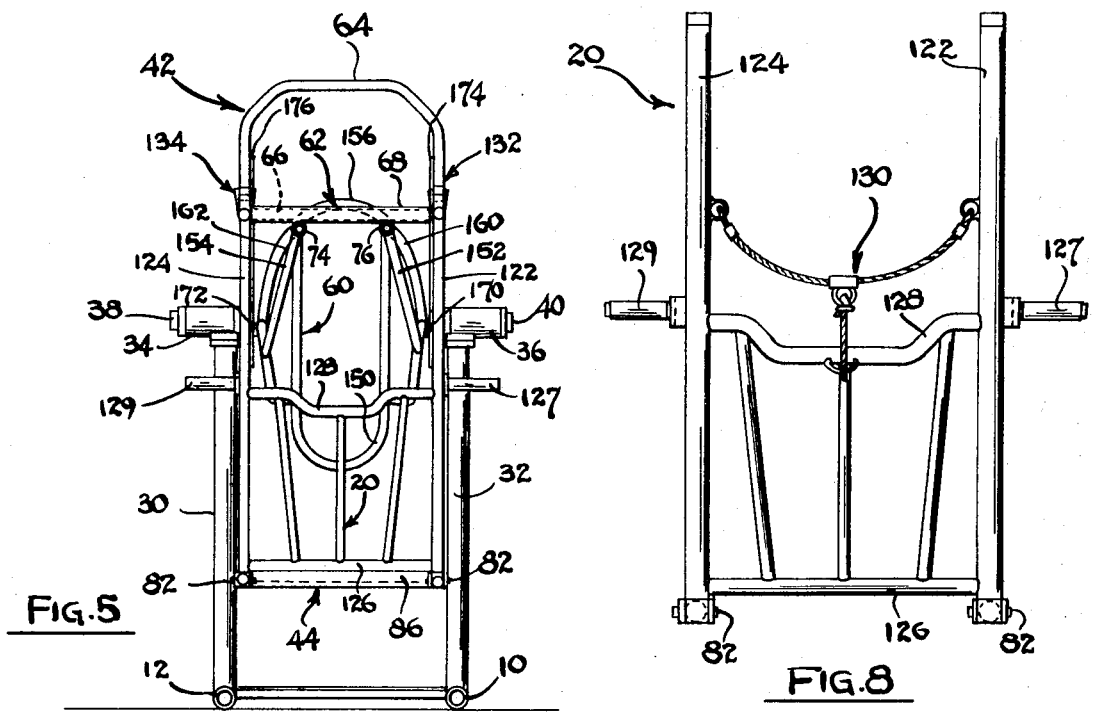
FIG. 5
FIG. 8

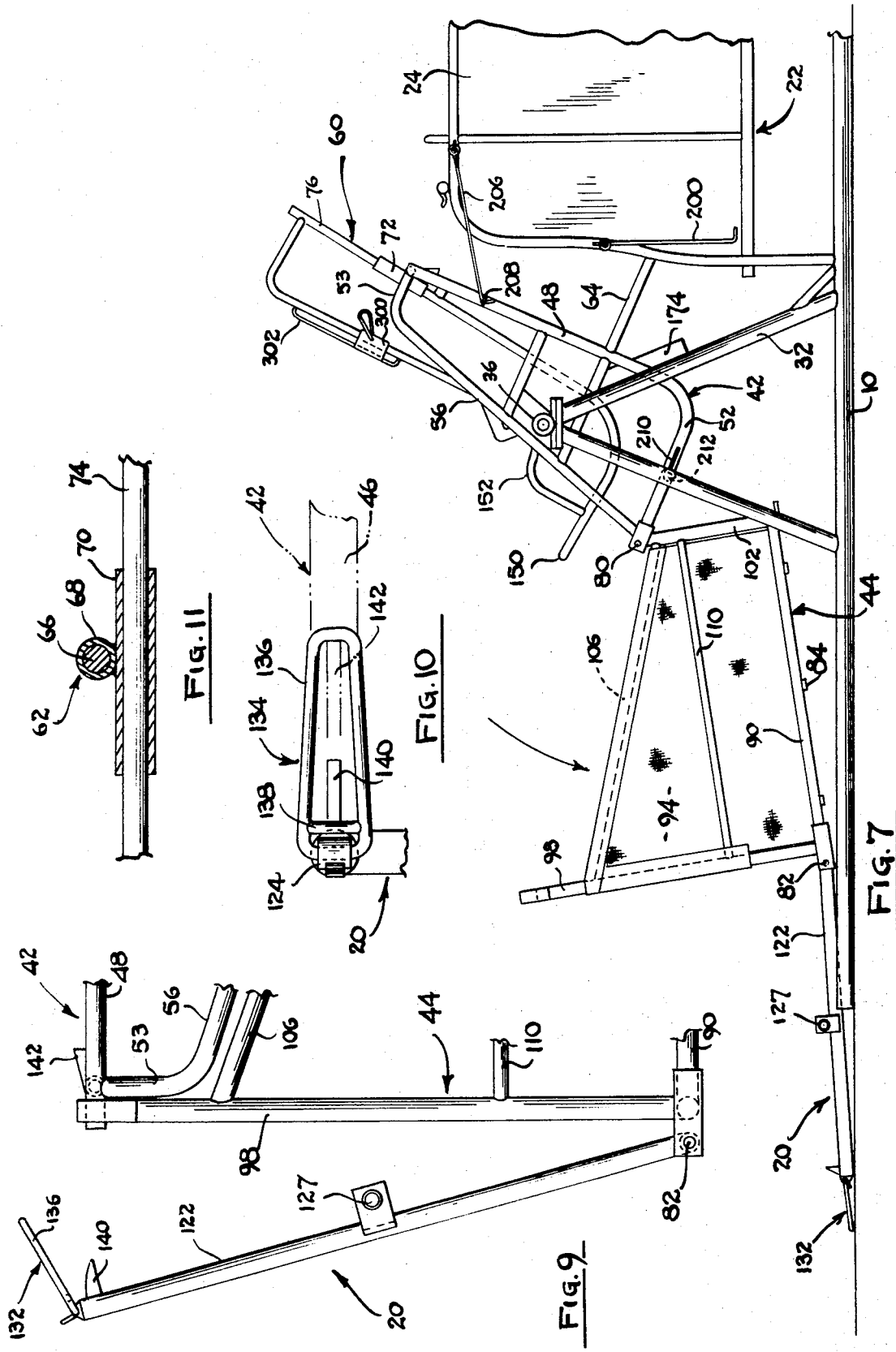

ANIMAL HANDLER

BACKGROUND OF THE INVENTION

One of the problems in sheep ranching is the holding of sheep while operating upon them.

Sheep tend to have the disease of foot rot. Periodically the feet of the sheep must be inspected and offending portions of the hooves removed.

Sheep and other animals must also be inspected or held for other reasons such as inspections by a veterinarian, castration, or shearing.

Although the apparatus of this invention is adapted particularly for use in handling sheep, it is within the contemplation of this invention that the apparatus could be used to handle other animals.

The most used method of capturing and holding sheep for removal of rotted hooves is to have a person tackle the sheep, throw the sheep off of its feet, and secure the feet.

U.S. Pat. No. 2,980,060 to C.J. Marsh shows a "Device for Holding Sheep," but no apparatus is shown for upending the sheep in a convenient fashion, and it is assumed that the inventor would need to capture and upend the sheep manually.

U.S. Pat. No. 2,960,966 to J.M. Monson teaches a table for holding a sheep for shearing. Again it is assumed that the sheep would need to be upended manually.

U.S. Pat. No. 1,987,977 to J.Y. Shannon shows an animal cradle which is adapted to hold a lamb for marking or for otherwise operating upon the lamb. It appears that the inventor needed to capture and upend the lamb manually.

U.S. Pat. No. 3,548,787 to W.W. Watson teaches another modification of a sheep cradle.

U.S. Pat. No. 3,292,590 to J.L. Powell shows still another cradle apparatus for holding sheep.

U.S. Pat. No. 3,276,433 to M.S. Tougas, et al. shows a squeeze chute for animals which, apparently, is intended to be used to upend animals, The patent, however, is misleading. The patent shows means for squeezing the torso of a sheep with a sheep standing upon a platform. The entire apparatus is then upended, and the drawings show a sheep with its legs extending straight up. This is misleading. Should such apparatus be used, the sheep would pull back its feet as the apparatus is tilted and would struggle to escape.

None of the above-mentioned apparatus is adapted to entice entry of a sheep, fully grasp the sheep and upend it for operation.

BRIEF DESCRIPTION OF THE INVENTION

The apparatus contemplated by this invention is an animal capturing, upending and holding apparatus, particularly for sheep, that eliminates the hand catching, throwing and struggling with sheep during the process of trimming their hooves for foot rot or the process of trimming long curled hooves that lead to foot rot. It also has other veterinary uses.

The apparatus of this invention is an elevated, split, revolvable animal cage, particularly for sheep, containing an adjustable sheep-holding cradle.

The apparatus of this invention is placed at the exit of a regular sheep cutting chute. The sheep are driven from corrals into the cutting chute, up a ramp, and into a holding compartment. The holding compartment preferably has opaque sides, an opaque sliding gate at the rear, and a barred see-through gate in front to cause the sheep to desire to proceed forward. The compartment preferably has bars over the neck and shoulders of the sheep to prevent jumping prior to entrapment in the revolvable split animal cage of this invention. When the barred see-through gate is lifted, a battery operated hot shot or a hand slap on the sheep's posterior sends it into the revolvable split cage of this invention.

The sides of the cage of this invention are split lengthwise from substantially the top of the exit end to a lower point on the entrance end of the cage, forming an upper or frame portion and a lower or chute portion. The two parts of the cage are articulated for relative rotation about a substantially horizontal axis transverse to the cage and substantially at the top of the entrance end of the chute portion. The two parts, comprising frame and chute members, are latched together during loading of and upending of the cage.

The sides of the lower or chute member of the split cage are preferably opaque to avoid distracting the entereing animal. The bottom of the chute member is preferably a solid platform to support the animal during loading of the cage. The front end of the cage is closed by an end gate, the bottom part of which is preferably opaque, and the upper part of which is open except for a crotch rope. The sheep's head and forward body portion are guided into the gate opening by the crotch rope, the opening attracting the sheep into extending its head into the opening. The crotch rope limits the amount of extension of the sheep through the opening.

The end gate is preferably hinged at its bottom to the bottom of the exit end of the chute portion of the cage and is latched at the top to the frame portion of the cage, the latch performing the double purpose of keeping the end gate closed and of holding the two parts of the cage together.

An animal cradle is positioned in upside down position on the frame portion of the cage. It is slidable in tubular members upon the forward end of the frame portion. The tubular members are preferably centrally positioned between the sides of the frame portion and are rotatable about a substantially horizontal axis transvers of the frame portion to allow the cradle to be moved forward and backward with respect to the frame portion and to allow the rearward portion of the cradle to be lowered. The rearward portion of the cradle has a downwardly extending loop so that lowering of the rearward portion of the cradle over the rump of an animal entraps the animal between the cradle, the end gate, and the platform. Forwardly and downwardly sloping slots and lineal ratchets on both sides of the entrance end of the frame portion of the cage are engaged by studs on the cradle to lock the cradle down against the entrapped animal.

With the cradle pressed solidly on the sheep's back and rump, the looped portion forms a chair over the hind quarters of the animal and between its rear legs.

The split cage and cradle are mounted, preferably from the frame portion, for rotation about a substantially horizontal axis which is transverse to the chute member. The supports for the bearings on the horizontal axis are, typically, a pair of upstanding spaced-apart bipods which are cross braced.

Before loading the cage, the cage is preferably latched into position with the platform bottom of the chute portion substantially horizontal. The cradle is retracted upward, clearing the entrance to the cage.

After an animal has entered the cage, the cradle is lowered onto the animal, entrapping it in the cage between the platform, the end gate, and the cradle.

The cage is then freed to rotate about its horizontal axis of rotation. The cage is next rotated and upended into an over-vertical position, transferring the weight of the animal from the platform onto the cradle. Although the rotation may be made with a motor, or the like, typically handles are provided for upending the cage and animal. The sheep has walked into the cage and has not been manhandled, whereby the sheep is relatively unexcited.

Shackles are provided upon the cradle for further holding of the sheep. The shackles are fastened to the upended sheep, and the front end gate is unlatched from the frame portion of the cage, allowing the end gate to unfold from the chute portion of the cage and the chute portion to unfold from the frame portion, leaving the animal sitting, shackled, in the cradle.

To remove the sheep from the cradle, the sheep is unshackled, and the cradle is tilted forward, whereupon the sheep scrambles onto the platform of the chute portion of the cage which now forms a down ramp to the ground.

It is therefore an object of this invention to capture an animal.

It is another object of this invention to upend the captured animal.

It is a particular object of this invention to capture and upend a sheep.

It is still a more particular object of this invention to provide apparatus for achieving the above-enumerated objects.

BRIEF DESCRIPTION OF THE DRAWINGS

Other objects will become apparent from the following description, taken in connection with the accompanying drawings, in which:

FIG. 5 is a view, taken from the left in FIG. 2;

FIG. 6 is a side view of the apparatus of this invention in its upended position;

FIG. 7 is a side view of the apparatus of this invention with the split cage in its fully opened position;

FIG. 8 is a profile view of the end gate of the cage of this invention;

FIG. 9 is a side view of a partly opened end gate on the cage of this invention;

FIG. 10 is a top view of the latch holding the end gate to the frame portion of the split cage of this invention; and FIG. 11 is a side view, partly in section, showing the tubular members connecting the cradle of this invention in sliding fashion to the frame portion of the split cage of this invention.

DETAILED DESCRIPTION OF THE INVENTION

Figure 3:
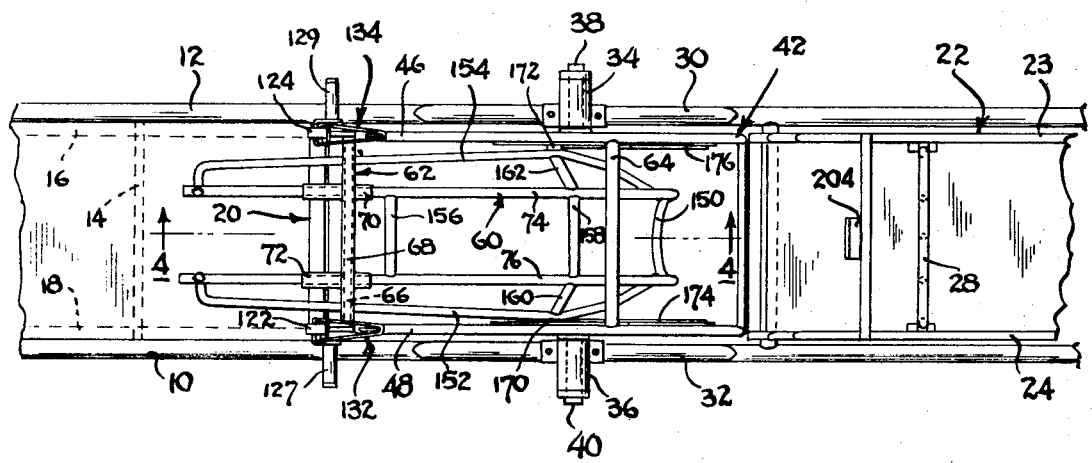
FIG. 3 is a top view of the apparatus of FIG. 2.

The apparatus of the invention is substantially symmetrical relative to a vertical, longitudinal plane 4—4 (See FIG. 3).

Figure 1:
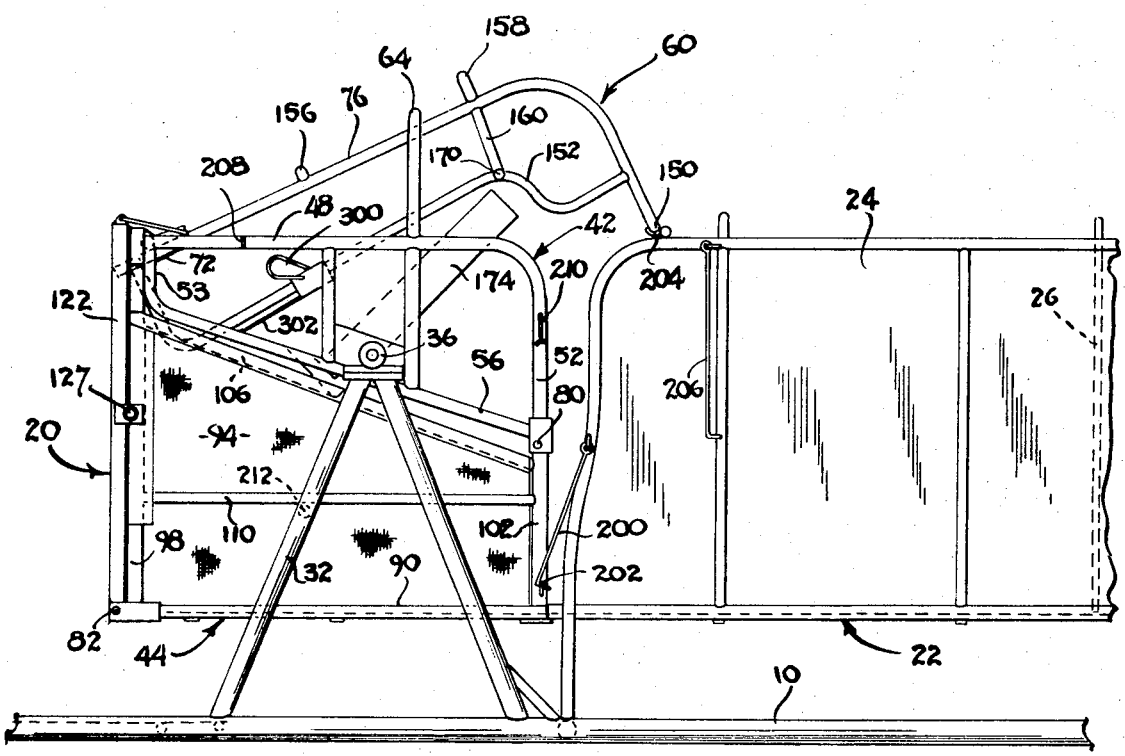
FIG. 1 is a side view of the apparatus of this invention in its ready-to-load position.

In FIG. 1, the apparatus of this invention is shown in position ready to load, for example, a sheep. A pair of substantially parallel longitudinally extending pipes 10 and 12 (See FIG. 3), together with cross bracing such as cross braces 14 form a base for the apparatus. Flat metal pieces 16,18 are positioned on the pipes 10,12 at the exit end of the apparatus to support the end gate 20 in reclining position (see FIG. 7). At the entrance end of the apparatus, the pipes, 10,12 support a raised chute 22 which is a holding compartment for sheep awaiting entrance to the cage of this invention. The sides 23,24 of the chute 22 are preferably opaque to guide the enclosed sheep. The rear gate 26 of the chute or compartment 22 is preferably opaque, and the forward gate 28 is preferably a barred see-through gate which entices the enclosed sheep to attempt forward movement.

Designations such as "longitudinal," "vertical," "upstanding," "transverse," "inclined," "top," "bottom," "entrance end" and "exit end" are used herein to describe the apparatus in its loading position of FIG. 1 unless otherwise specified. When such terms are used in the claims, it is intended to reflect the meaning of the specification, and upending of the apparatus wherein "vertical" or "upstanding" members become horizontal or inclined shall not avoid the claims.

A pair of bipod members 30,32 are supported from the base members 10,12,14 to carry bearings 34,36. It is important to note that the bipods 30,32 are exemplary only, and the invention is not to be limited to the use of bipods for supporting the bearings 34,36, for many other structures could be used to support such bearings. The bearings are shown detachable so that the corresponding pivot members 38,40 may be inserted before the bearings 34, 36 are attached (by means not shown) to the top of the bipods 30,32. It is to be stressed that although journal bearings are shown, other types of bearings, such as ball or roller bearings, for example, may be used. Further, although the pivot is shown attached to the frame portion 42 of the cage of this invention with the female bearings attached to the bipods 30,32, the bearings may be reversed, if desired, without departing from the scope of the invention. The bearings 34,36 are spaced apart on opposite sides of the support member. The axes of the bearings 34,36 are substantially coaxial and substantially horizontal, and directed transversely to the chute portion 44 of the cage of the invention.

The frame portion 42 has longitudinal bars 46,48, vertical bars 50,51,52,53 and inclined bars 54,56 forming the sides thereof. The vertical bars 51,53 are on the exit end of the frame member 42, and the vertical bars 50,52 are on the entrance end of the frame member 42. The longitudinal members 46,48 define the top of the sides of the frame portion 42. The inclined members 54,56 define the bottom of the sides of the frame portion 42. The members 51,53 are shorter than the members 50,52 to accommodate the incline of members 54,56. In the loading position, prior to rotation of the cage of this invention, the longitudinal members 46,48 are substantially horizontal. The axis of rotation of the bearings 34,36 is positioned between the upper bars 46,48 and the lower bars 54,56 so that the center of gravity of the entire cage and the cradle 60 is below the axis of the bearings 34,36 in the position shown in FIG. 1 and so that the center of gravity of the frame portion 42 and the cradle 60 is below the axis of the bearings 34,36 in the position of FIG. 7. A compromise on the position of the enter of gravity is occasioned by the desire to rotate the apparatus, as shown in FIG. 6, without excessive effort. The sides of the frame portion 42 are cross braced by transverse members 62,64. Member 64 is arcuate and sufficiently high to clear the cradle 60 when the cradle 60 is in its retracted position, shown in FIG. 1, wherein the cradle 60 does not block the entrance to the chute portion 44 of the cage. Member 62 is positioned at the exit end of the cage.

The transverse member 62, as shown particularly in FIG. 11, preferably comprises a rod 66, which is rigidly attached to the frame portion 42, and a sleeve 68 which is freely rotatable upon the rod 66. Attached to the sleeve 68, and substantially symmetrically disposed relative to the plane 4—4, are a pair of tubular members 70,72 which receive the longitudinal members 74,76 of the cradle 60 in a sliding fit.

The chute portion 44 is supported at its entrance end by the frame portion 42. The chute portion 44 is hinged by hinges 80 at the upper edge of its entrance end to the lower edge of the entrance end of the frame portion 42. The chute portion 44 is further supported by the end gate 20. The chute portion 44 is hinged by hinges 82 at the lower edge of the exit end thereof to the lower end of the end gate 20. The end gate 20, in turn, is attached for support at its upper end to the frame portion 42.

Figure 4:
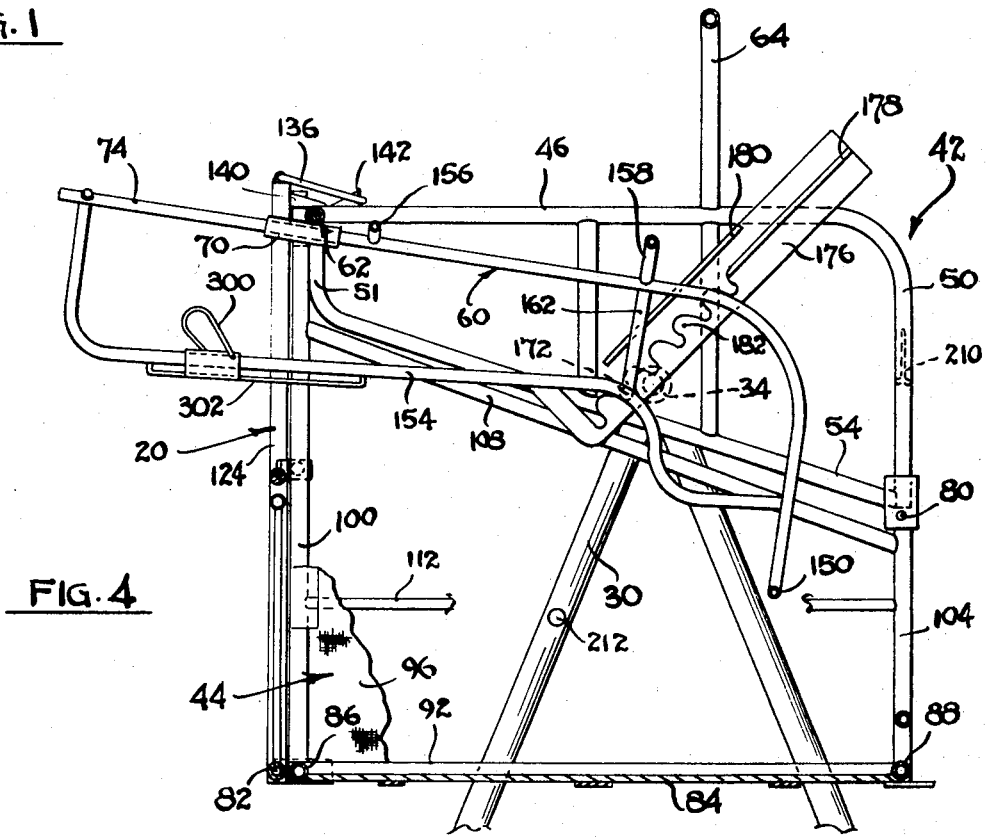
FIG. 4 is a view, partly in section, taken at the longitudinal, vertical plane of symmetry 4—4 in FIG. 3.
Figure 2:
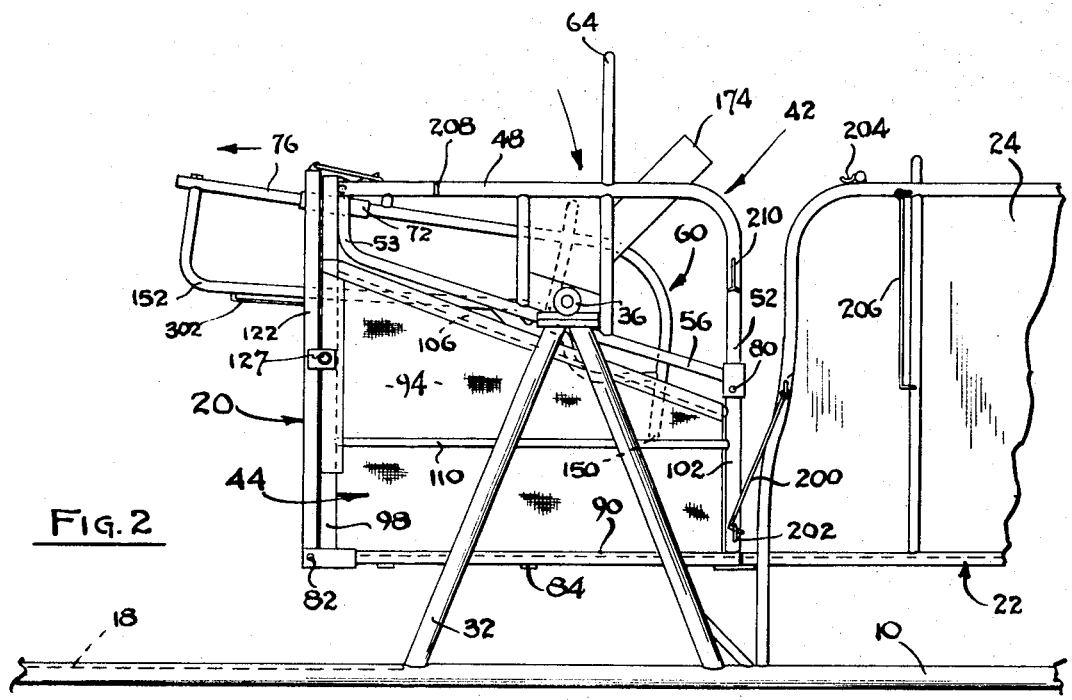
FIG. 2 is a side view of the apparatus of this invention in its loaded position prior to rotation.

The bottom of the chute portion 44 comprises a platform 84 for supporting the enclosed animal. The platform 84, shown particularly in FIG. 4, is supported by a bottom frame comprising rigid side members 86,88 and end members 90,92. The bottom platform 84, for example, may be fabricated of plywood.

The sides 94,96 of the chute portion 44 are preferably opaque. They may be made, for example, of canvas or plywood. The frame of the sides comprise forward upstanding members 98,100, rearward upstanding members 102,104, inclined longitudinal upper rails 106,108 and longitudinal medial reinforcing members 110,112. The forward upstanding members 98,100 extend upward to meet the top rail 48 of the frame portion 42. A pair of guiding plates are attached to the top end of the upstanding members 98,100 to guide the members 98,100 into engagement with the members 46,48 and to prevent side sway of the chute portion 44.

The end gate 20 is hinged at 82, on the bottom edge thereof, to the bottom of the chute portion 44. A pair of connecting flanges attach the hinges 82 to the bottom rails 90,92 of the chute portion 44.

The end gate comprises a pair of upstanding members 122, 124 on either side thereof. A bottom transverse rail 126 attaches the two upstanding members 122,124 at the lower end thereof (See FIGS. 5 and 8) An arcuate cross member 128 is preferably depressed in the center to entice the enclosed animal to direct its head toward the center of the gate.

In a preferred embodiment, a crotch rope 130 (shown only in FIG. 8) is used to hold the head of the enclosed animal up while preventing the animal from climbing over the rail 128.

Handles 127,129 are attached to the members 122,124.

The details of the latches 132,134 which attach the upper end of the end gate 20 the frame portion 42 are shown particularly in FIG. 10. The loop 136 is hinged on the end of the upstanding member 124. The loop has a cross bar 138 which strikes the stop 140 on the member 124. A dog 142 is positioned upon the top of the member 42. A elongated loop member 136 engages the dog 142 to hold the end gate 20 closed, to support the end gate 20, and hence to support the chute portion 44.

The animal cradle 60 is particularly shown in FIG. 3. A pair of longitudinally directed members 74,76 are positioned within the tubular members 70,72 of the frame portion 42 to slide in such tubular members. The members 74,76 are preferably made of the same piece and form a loop at the entrance end of the apparatus. The loop 150 is curved downward to form an animal seat. The seat characteristic may best be observed when the cradle 60 has been upended as shown in FIGS. 6 and 7. The sides 152,154 of the cradle 60 form a rail enclosure for the supported animal. Cross braces 156,158 are positioned transversely of the members 74,76 to complete the cradle member 60. Side braces 160, 162 transversely of the cradle member 60 reinforce the side rails 152,154.

At the junction of the members 152,160 and at the junction of the members 154,162 are outwardly projecting studs 170,172. A pair of slots and lineal ratchet members 174,176 are inclined and attached to the frame portion 42. The incline, in the position of FIG. 1, is forward and downward. Slots and lineal ratchets are positioned on the inside of the members 174,176 to engage the studs 170,172 on the cradle 60. Details of the slot and lineal ratchet member 172 are shown in FIG. 4. A slot is formed between the two flange or guide members 178,180. At the lower end of the flange 178, and extending downwardly therefrom, are a plurality of ratchet teeth 182 which engage the stud 172 to hold the cradle in place against an animal.

It is again to be understood and emphasized that the words longitudinal and transverse refer, respectively, to the direction along the chute portion 44 when the chute is in its loading position and a direction across the chute portion 44. The word upstanding refers to the orientation of a member when the chute portion is in its loading position. When the members are rotated, the directions may no longer be as stated, but the relative positions, taking the rotations into account, or taking the translation and rotation of the cradle 60 into account, remain the same.

On either side of the apparatus, a hook member such as member 200 is adapted to engage a loop member 202 to latch the holding chute 22 to the chute portion 44 of the cage of this invention during loading of the animal as shown in FIG. 1.

A support 204 is preferably positioned upon the holding chute 22 to support the cradle 60 during loading of the animal.

On either side of the apparatus, a second holding or hook member such as member 206 is adapted to engage a loop member 208 to latch the holding chute 22 to the frame portion 42 when the apparatus is upended.

A stop 210 on the frame portion 42 engages a corresponding fixed member 212 on the leg of the bipod 32.

Leg cuffs 300 are preferably positioned upon the end of the cradle 60 opposite the seat end 150. To prevent the cuffs from twisting, the leg cuffs 300 preferably engage a guide 302 on the cradle 60.

To load the apparatus, the end cage 20 is latched to the frame portion 42 by the latches 122,124. The hook 200 engages the loop 202. The cradle 60 is retracted and supported by the support 150. The loading position is shown in FIG. 1. An animal, such as a sheep, enclosed within the holding chute 22 sees an opening at the other end of the chute. When the gate 28 is opened, the sheep enters the cage of this invention, standing upon the platform 84 and attmpting to escape. The crotch rope 130 prevents the escape, and the sheep extends its nose over the crotch rope.

The studs 170,172 are inserted into the slots of the members 174,176, and they are forced downward against the rump of the animal, entrapping the animal between the cradle 60, the platform 84, and the closed end gate 20. The seat 150 of the cradle 60 fits over the rump of the enclosed animal and between its hind legs. The ratchet, such as ratchet 182, holds the cradle 60 firmly against the animal. The lowered, loaded position of the cradle 60 is shown in FIGS. 2-5.

The latch 200 is next released from the loop 202, the handles 127,129 are grasped, and the apparatus is upended over-center into the position of FIG. 6 with the stop 210 against the stop 212. The latch 206 is inserted into the loop 208 to hold the apparatus in this position. The sheep is sitting in the seat 150 of the cradle 60. The cuffs 302 are next attached to the front feet of the sheep to prevent its escape and to hold the feet in position for operation thereon.

In FIG. 6, the latch is shown open, preparatory to lowering the chute portion 44 and the end gate 20.

After opening of the latches 132,134, the chute portion 44 rotates downward around the hinge axis 80 until the forward end of the chute contacts the ground. The end gate 20 pivots around the hinge axis 82 until the gate is lying upon the ground. As shown in FIG. 7, the chute portion 44 may, if desired, merely be lowered until the chute rests on the base 10.

The sheep may now be operated upon, for example, by trimming its hooves.

The shackles or cuffs 300 are then removed from the sheep, the cradle 60 is tipped forward, the sheep scampers away through the lowered chute portion 44 and over the end gate 20.

In summary, the apparatus of this invention comprises a frame, an animal chute, an end gate at the exit end of the chute, and an animal cradle into which it is desired to upend an animal. The cradle is inverted during loading of the chute, and the cradle is swiveled and longitudinally slidable on a first end of the cradle relative to the exit end of the frame. On the second end of the cradle an animal seat is formed. The cradle is positioned to selectively be opened into its retracted position during loading of the animal, and to bar the entrance end of the chute when in its extended position. Inclined slot and lineal ratchet means are provided on the entrance end of the frame for locking the cradle into its extended position wherein the animal is trapped. The chute and frame are pivoted relative to each other about a transverse axis on their entrance end, and the exit end of the chute is connected, through the end gate, to the exit end of the frame, with the end gate bridging the gap between the chute and the frame. A latch is provided on the top of the end gate to hold the chute, end gate, and the frame together. The entire structure is supported for upending about a substantially horizontal axis to upend a trapped animal into the cradle.

It should be apparent that although handles have been shown for upending an animal, motive means such as an electric motor, or electric, hydraulic or pneumatic actuators (not shown) could be used to upend the apparatus.

It should also be apparent that although manual latches have been shown, automatic latches of the electromagnetic type (not shown) could have been used.

Further, it should be apparent that the cradle could have been power actuated.

It is within the conception of this invention that a sensor such as a feeler (not shown) or a beam of light with an electric light sensor could have been used to sense the presence of an animal. Further, a weight sensor, sensing the weight of the animal could be used to sense the presence of an animal within the cage.

The apparatus may be programmed, automatically to channel an animal into the apparatus, lower the seat onto the animal, upend the animal, shackle the animal and release the chute from the rotatable frame, holding the animal ready for the operation. When the sheep is released, the apparatus could again automatically, by power means (not shown) be reassembled and the cradle retracted, ready for the next animal. The next animal could be released to enter the waiting cage by automatically opening the exit gate of the holding chute or compartment.

Thus, the apparatus of this invention provides an economically feasible means for controlling an animal, such as a sheep, during operation thereon.

Although the invention has been described in detail above, it is not intended that the invention should be limited by that description, but only by that description taken in combination with the following claims:

I claim:

1. Apparatus for upending an animal, comprising:
   support means;
   first frame means;
   a first pair of spaced-apart, substantially coaxial bearings between said support means and said first frame means supporting said first frame means for rotation about a first substantially horizontal transverse axis relative to said support means;
   first animal chute means, including a platform for supporting an animal;
   a second pair of spaced-apart, substantially coaxial bearings between said first chute means and said first frame means, adjacent a first end of said platform, supporting said first chute means for rotation about a second substantially horizontal transverse axis relative to said first frame means;
   first latch means for latching said first frame means and said first animal chute means together in fixed relation about said second axis; and
   an animal cradle, supported by and translatable relative to said first frame means between an upward retracted position and downward extended positions, including locking means for locking said cradle in said extended positions relative to said frame means.

2. Apparatus as recited in claim 1 in which said first frame means, said cradle, and said first chute means are rotatable about said first axis from a loading position into an upended position, and said platform, when latched by said first latching means to said first frame means, is substantially horizontal in said loading position.

3. Apparatus as recited in claim 2 in which said cradle, in a ready-to-load position, is retracted relative to said first frame means, allowing entrance of an animal into said first chute means; and said cradle, in a loaded position, is in an extended position relative to said first frame means positioned to block the entrance to said chute means and to enclose an animal between said cradle and said platform.

4. Apparatus as recited in claim 3 in which said first chute means is unbalanced about said second axis, and is connected, when unlatched from said first frame means, to rotate freely about said second axis relative to said first frame means.

5. Apparatus as recited in claim 4 and further comprising:
an end gate;
a third pair of spaced-apart, substantially coaxial bearings between said end gate and said first chute means adjacent a second end of said platform, supporting said end gate for rotation about a third substantially horizontal transverse axis relative to said first chute means; and
said latch means including a latch for latching said end gate into position and for closing said second end of said chute means.

6. Apparatus as recited in claim 5 in which said latch means comprises:
said latch for connecting said end gate to said first frame means; and
said latched end gate enclosing and holding said first chute means in fixed position relative to said first frame means to entrap an animal between said platform, said cradle, and said end gate.

7. Apparatus as recited in claim 5 in which said first chute means has opaque side panels; and
said end gate has the bottom portion barred, the top portion being partly obstructed to prevent an animal from emerging therethrough and being otherwise open to entice such animal into directing its head into said top portion.

8. Apparatus as recited in claim 5 in which said support means comprises a pair of substantially identical spaced-apart upstanding bipods, said first pair of bearings being positioned substantially at the apexes of said bipods, and means for rigidly holding said spacing between said bipods.

9. Apparatus as recited in claim 5 in which said first frame means comprises:
a rigid frame having two substantially identical side portions, each of said side portions being mounted on a different one of said bearings of said first pair of bearings;
a pair of cross bars between one corresponding edge of each of said side portions;
a pair of spaced-apart, substantially parallel, centrally positioned tubular members attached to one of said cross bars; and
a pair of substantially parallel lineal ratchets forming said locking means and being positioned upon said side portions.

10. Apparatus as recited in claim 9 in which said cradle comprises:
a pair of substantially identical sides attached together at one end to form a seat and having arcuate members between said sides forming a back, said back including, toward one end thereof, a pair of substantially parallel spaced-apart rods directed in the lengthwise direction of said cradle and conformed and spaced to slide in said tubular members on said first frame means, and each of said sides having a projecting stud for engaging said lineal ratchets;
whereby said cradle is movable lengthwise, relative to said first frame means in said tubular members, and said studs engage said ratchets to hold said cradle in its extended position.

11. Apparatus as recited in claim 10 in which said first chute means comprises:
a platform floor, opaque sides, upstanding ends, inclined top side rails extending between the tops of the ends of said chute means, and hinge means on the top of the entrance end thereof and the bottom of the exit end thereof;
said chute means being hinged to said frame means by said hinge means on the entrance end thereof and to said end gate by said hinge means on the exit end thereof.

12. Apparatus as recited in claim 11 and further comprising latches on the top of said end gate to attach said end gate to said frame means and to cause said end gate, when said latch is connected to said frame means, to support the exit end of said chute means.

13. Apparatus as recited in claim 12 in which said end gate is opaque at the bottom thereof and has an opening in the top thereof which is bridged by a crotch rope.

14. In combination:
a frame;
a two-piece animal chute, having an entrance end and an exit end, pendulously supported by said frame;
an end gate hinged to the bottom edge of the exit end of said chute, the exit end of said chute being selectively barred or opened by said end gate;
an animal cradle, said cradle being inverted, swiveled and longitudinally slidable on a first end thereof relative to the exit end of said chute, having a seat on a second end thereof, and being positioned, swiveled and slidable between a retracted position away from the entrance end of said chute and an extended position barring the entrance end of said chute.

15. Apparatus as recited in claim 14 and further comprising inclined slot and lineal ratchet means between said cradle and said chute for locking said cradle into its extended position.

16. Apparatus as recited in claim 15 and further comprising a latch on said end gate for attaching said end gate, when closed, to said chute.

17. Apparatus as recited in claim 16 in which said end gate, when latched to said chute, bridges a connection between said two pieces of said chute at the exit end of said chute to hold said two pieces of said chute and said end gate substantially rigidly together.

18. Apparatus as recited in claim 17 in which the sides of said chute and the bottom of said closed end gate are opaque, and the top of said end gate has an opening therein bridged by a crotch rope.

19. Apparatus as recited in claim 18 and further comprising means for rotating said two-piece chute, cradle, and end gate about an axis.

20. Apparatus as recited in claim 19 and further comprising means for latching said chute into a position wherein its floor is substantially level.

21. Apparatus as recited in claim 19 and further comprising means for latching said frame into its upended position.

22. Apparatus as recited in claim 21 in which said upended position is over-center relative to an axis.

23. In combination:
a split cage having an exit end and an entrance end, split lengthwise from substantially the top of said exit end to a lower point on the entrance end thereof, forming an upper frame portion and a lower chute portion, said frame and chute portions being articulated for relative rotation about a first substantially horizontal axis transverse to a line from the entrance to exit end of said cage and substantially at the top of the entrance end of said chute portion;
an end gate, hinged to the bottom edge of said exit end of said chute portion and latched at the top of said end gate to said frame portion of said cage to hold said frame and chute portions together and said gate closed; and
guide means on the front of said frame portion, rotatable about a second substantially horizontal axis, transverse to a line from the entrance end to the exit end of said cage;
an animal cradle, positioned in upside down position on said frame portion of said cage, slidable in said guide means for a substantially forward and aft direction and for rotation about said second horizontal axis relative to said frame portion, the rear portion of said cradle having a downwardly extending loop to entrap an animal between said cradle, said end gate, and said chute.

24. Apparatus as recited in claim 23 in which the bottom portion of said end gate is opaque.

25. Apparatus as recited in claim 24 in which the top of said end gate has an opening therein bridged by a crotch rope.

26. Apparatus as recited in claim 25 in which said guide means comprises a pair of tubular members mounted for rotation relative to said frame portion about a substantially horizontal axis transverse to a line from the entrance end to the exit end of said cage, said tubular members being sized for a sliding fit with said animal cradle.

27. Apparatus as recited in claim 26 and further comprising lineal ratchet means between said animal cradle and said frame portion for locking said cradle into a position.

28. Apparatus as recited in claim 25 and further comprising means for mounting said split cage pendulously about a third horizontal axis.

* * * * *